No. 691,246. Patented Jan. 14, 1902.
A. W. CRAM.
PIPE CONNECTION.
(Application filed Mar. 28, 1901.)
(No Model.)
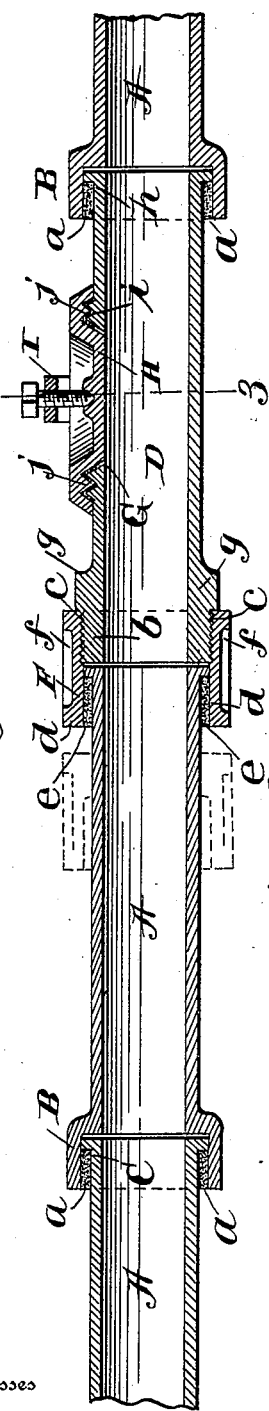
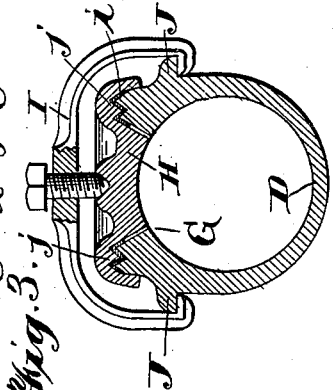
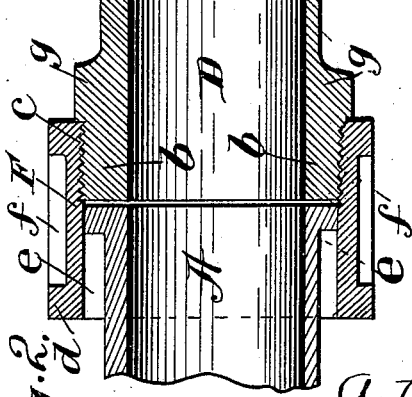
Witnesses
Geo. E. Fuch.
Chas. P. Wright Jr.
Inventor
A. W. Cram,
By A. S. Pattison
Attorney

UNITED STATES PATENT OFFICE.

ALONZO W. CRAM, OF HAVERHILL, MASSACHUSETTS, ASSIGNOR TO WILLIAM D. CRAM, OF HAVERHILL, MASSACHUSETTS.

PIPE CONNECTION.

SPECIFICATION forming part of Letters Patent No. 691,246, dated January 14, 1902.

Application filed March 28, 1901. Serial No. 53,246. (No model.)

*To all whom it may concern:*

Be it known that I, ALONZO W. CRAM, a citizen of the United States, residing at Haverhill, in the county of Essex and State of Massachusetts, have invented new and useful Improvements in Pipe Connections, of which the following is a specification.

My invention relates to improvements in pipe connections, and pertains to an improved connection which is especially intended for use in connection with sewer-pipes, though it is adapted for use in fittings of all kinds where it is desired to remove one section of the pipe for inserting a clean-out, replacing an injured or cracked section, or inserting a section with a Y or a T, all of which will be fully described hereinafter, and particularly pointed out in the claims.

The object of my invention is to avoid the necessity of lifting up several sections of a line of pipe where the end of one section of pipe fits into the adjacent end of the other section when it is desired to remove one section and to replace it by another section for any reason.

Where a line of piping consists of a plurality of sections which have their ends telescoping or fitting one within the other in order to remove a section and replace it by another, it has been necessary to loosen up a number of the sections in order to insert another section, which necessity my present invention avoids.

In the accompanying drawings, Figure 1 is a longitudinal sectional view of a line of piping, one section of which embodies my invention. Fig. 2 is an enlarged sectional view of my improved pipe connection. Fig. 3 is a cross-sectional view on the line 3 3 of Fig. 1, showing the cover for the clean-out and the clamping-yoke in position. Fig. 4 is a side elevation of my improved pipe-section, showing the specific location of the lugs for the engagement of the clamping-yoke. Fig. 5 is a longitudinal sectional view of a line of piping without my improved section, showing several sections of pipes moved to one side in dotted lines in order to insert an old form of section.

Referring now to Figs. 1, 2, 3, and 5, A is the ordinary form of pipe-section, having at one end the enlarged or hub portion B for the reception of the smaller end C of the adjacent pipe to allow the space $a$ for calking purposes, as is well understood by those skilled in the art.

My improvement consists of a section D, which has one end provided with a boss $b$, the said boss being screw-threaded and adapted to receive the internally-screw-threaded end $c$ of a connecting screw-hub F. This hub F has its opposite end $d$ enlarged to correspond with the enlargement B of the section A and is adapted to receive the smaller end of the said section, as illustrated, and to provide the calking-space $e$, the equivalent of the calking-space $a$ formed in the ordinary pipe-section. The internally-screw-threaded end $c$ of the hub F is of such size that the hub can be moved endwise upon the smaller end of one of the pipe-sections A, as shown in dotted lines, Fig. 1, for the purpose of enabling my improved pipe-section D to be placed in position. When it has been placed in position, the hub F is then screwed to the position shown in solid lines, Fig. 1, when the calking operation can be performed and the connection A completed. The hub F is provided with a plurality of longitudinally-extending ribs $f$, constituting shoulders for the engagement of a spanner-wrench of any desired form for the purpose of turning the hub to its position upon the end of the pipe-section D. Also the pipe-section D is provided with several shoulders or projections $g$, with which a spanner-wrench is adapted to engage for the purpose of holding the pipe-section against turning while the screw-hub is being turned to its position thereon.

The particular object of my invention is to simplify and to cheapen the insertion of a new pipe-section in a line of piping when it is necessary to remove one section of the line of pipe for any purpose. For instance, should one of the sections of a line of pipe become broken or otherwise injured, thus making it necessary to remove it, it would only be necessary to cut out or to break out the injured section, without disturbing the other sections of the pipe, and to insert my improved section by first placing the screw-hub F upon the smaller end of the pipe-section A, inserting the end *h* of my pipe-section into the enlarged portion B of the other section of the line of pipes, and bringing my improved section in alinement, and to then turn the screw-hub to position. It is only necessary then to calk the connections at opposite ends of my improved pipe-section and coupling and the job is completed. This is a great saving in time and labor, and hence considerably cheaper than the usual method required to replace a section of piping of the old form, and which is illustrated in Fig. 5. When the piping is of the old form, it is necessary to loosen several sections and to move them out, as indicated in dotted lines, Fig. 5, for the purpose of permitting the insertion of another section.

My invention is also of great utility when it is desired to insert in a line of piping a clean-out, and in this event my improved section will be provided with a clean-out opening G, the said opening having around its edge a groove *i*, adapted to receive a projection *j* upon the under side of the cover H. By means of this construction and the use of a suitable gasket a very tight joint can be made and with less pressure upon the cover, thus preventing the breaking of the yoke I, which sometimes occurs in forcing a cover of the ordinary construction to its seat sufficiently tight to prevent leaking. In this instance I also place the projections J upon the side of my improved section at a point above the center of the section, as shown in Fig. 4, so that a shorter yoke I can be used than where the projections are situated at a center line, thus very materially strengthening the yoke, as will be readily understood. The matter of casting the section with the projections at this point will be readily understood by those skilled in the art of casting and does not need explanation here.

My invention is also useful when it is desired to insert in a line of piping either a Y or a T, and in which event my improved section will be of the Y or of the T form instead of the clean-out form, as will be readily understood. In every instance, however, it will be seen that there is great saving of time and labor in placing my improved section and connection in a line of piping as compared with the old method of doing this.

Having thus described my invention, what I claim, and desire to secure by Letters Patent, is—

1. A pipe connection comprising a pipe-section having at one end a screw-threaded portion, its opposite end adapted to enter the adjacent large end of another pipe connection, and a screw-hub adapted to be screwed upon the screw-threaded end of the section, the opposite end of the hub being open to receive the adjacent end of the succeeding pipe and constituting a calking-space, substantially as described.

2. An improved pipe connection consisting of a pipe-section having one end adapted to coact with the adjacent end of another pipe-section, the opposite end of the section being screw-threaded, and a screw-hub having one end internally screw-threaded and of a size adapted to pass over the smaller end of the adjacent pipe-section, the opposite end of the hub being open and surrounding and constituting a calking-space between the interior of the hub and the exterior of the adjacent pipe-section, substantially as described.

3. An improved pipe connection consisting of a pipe-section having at one end an externally-screw-threaded boss, and a hub having an internally-screw-threaded end adapted to engage the screw-threaded boss, the opposite end of the hub being open and surrounding and constituting a calking-space between it and the adjacent end of the pipe-section, substantially as described.

4. An improved pipe connection consisting of a pipe-section having one end screw-threaded, a wrench-shoulder, and a hub having one end internally screw-threaded to receive the screw-threaded end of the pipe connection, its opposite end being open and surrounding and constituting a calking-space between it and the end of the adjacent pipe-section, the exterior of the hub provided with a plurality of wrench-shoulders, substantially as described.

In testimony whereof I have hereunto set my hand in the presence of two subscribing witnesses.

ALONZO W. CRAM.

Witnesses:
ARTHUR W. MITCHELL,
CHARLES J. HALPEN.